United States Patent
Shi et al.

(10) Patent No.: US 7,356,158 B2
(45) Date of Patent: Apr. 8, 2008

(54) METHODS AND APPARATUS FOR LOSSLESS DATA HIDING

(75) Inventors: Yun-Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 656 days.

(21) Appl. No.: 10/737,327

(22) Filed: Dec. 16, 2003

(65) Prior Publication Data

US 2006/0126890 A1 Jun. 15, 2006

Related U.S. Application Data

(60) Provisional application No. 60/434,088, filed on Dec. 17, 2002.

(51) Int. Cl.
*G06K 9/00* (2006.01)
*G06K 9/36* (2006.01)

(52) U.S. Cl. .................................. 382/100; 382/232

(58) Field of Classification Search ................ 382/100, 382/232, 168–172; 380/252, 287, 54; 713/176
See application file for complete search history.

(56) References Cited

U.S. PATENT DOCUMENTS

| | | | | |
|---|---|---|---|---|
| 5,778,102 | A * | 7/1998 | Sandford et al. | 382/251 |
| 6,278,791 | B1 * | 8/2001 | Honsinger et al. | 382/100 |
| 6,385,329 | B1 * | 5/2002 | Sharma et al. | 382/100 |
| 6,535,616 | B1 * | 3/2003 | Hayashi et al. | 382/100 |
| 6,546,139 | B1 * | 4/2003 | Kondo et al. | 382/232 |
| 6,748,362 | B1 * | 6/2004 | Meyer et al. | 704/500 |
| 2002/0051559 | A1 * | 5/2002 | Noda et al. | 382/100 |
| 2002/0172398 | A1 * | 11/2002 | Hayashi | 382/100 |
| 2003/0081809 | A1 * | 5/2003 | Fridrich et al. | 382/100 |
| 2003/0149879 | A1 * | 8/2003 | Tian et al. | 713/176 |
| 2004/0250078 | A1 * | 12/2004 | Stach et al. | 713/176 |

OTHER PUBLICATIONS

Tian; Wavelet-based reversible watermarking for authentication; Security and Watermarking of Multimedia Contents IV, Edward J. Delp III, Ping Wah Wong, Editors, Proceedings of SPIE vol. 4675 (2002) © 2002 SPIE.*

Golgan et al; Distortion-Free Embedding for Images; I. S. Moskowitz (Ed.): IH 2001, LNCS 2137, pp. 27-41, 2001; Springer-Verlag Berlin Heidelberg 2001.*

(Continued)

*Primary Examiner*—Andrew W. Johns
*Assistant Examiner*—Andrae Allison
(74) *Attorney, Agent, or Firm*—Connolly Bove Lodge & Hutz LLP

(57) ABSTRACT

Methods and apparatus are provided for subjecting an original, pixel domain image to an Integer Wavelet Transform (IWT) to obtain a matrix of wavelet coefficients; selecting at least one bit plane between a least significant bit plane and a most significant bit plane of the matrix of wavelet coefficients; compressing the at least one selected bit plane to produce free space in the at least one selected bit plane; embedding hidden data in the free space of the at least one compressed bit plane; and subjecting the at least one embedded bit plane to an Inverse IWT to produce a marked pixel domain image. Methods and apparatus are also provided for reversing this process.

54 Claims, 9 Drawing Sheets

OTHER PUBLICATIONS

Meerwald et al; A Survey of Wavelet-domain Watermarking Algorithms; Security and Watermarking of Multimedia Contents III, Ping Wah Wong, Edward J. Delp III, Editors, Proceedings of SPIE vol. 4314 (2001) © 2001 SPIE.*

Kundur et al; Digital Watermarking Using Multiresolution Wavelet Decomposition; http://www.ece.tamu.edu/~deepa/pdf/icassp98.pdf; 1999.*

Vehel et al; Wavelet Packet Based Digital Watermarking; Proceedings of the International Conference on Pattern Recognition—vol. 3 table of contents p. 3417 Year of Publication: 2000 ISSN:1051-4651.*

Meerwald et al; A Survey of Wavelet-domain Watermarking Algorithms; Security and Watermarking of Multimedia Contents III, Ping Wah Wong, Edward J. Delp III, Editors, Proceedings of SPIE vol. 4314 (2001).*

Jiri Fridrich, Miroslav Goljan, Rui Du "Invertible Authentication"—Center for Intelligent Systems, Department of Electrical Engineering, SUNY Binghamton.

B. Macq and F. Dewey "Trusted Headers for Medical Images", pp. 1-13 (Jul. 27, 1999).

A.R.Calderbank, Ingrid Daubechies, Wim Sweldens, and Boon-Lock Yeo "Wavelete Transforms That Map Integers to Integers", pp. 1-39 (Aug. 1996).

Shi, Yun Q. "Image and Video Compression for Multimedia Engineering", pp. 119-128 CRC Press LLC).

* cited by examiner

N x M Pixel Image 8 bits: 1, 1, 0, 0, 1, 0, 1, 0

1st BIT PLANE
2nd BIT PLANE
3rd BIT PLANE
4th BIT PLANE
5th BIT PLANE
6th BIT PLANE
7th BIT PLANE
8th BIT PLANE

| Images (512x512x8) | PSNR of marked image (dB) | Pay-load (bits) |
|---|---|---|
| Lena | 36.64 | 85,507 |
| Pepper | 29.11 | 69,285 |
| Tiffany | 28.91 | 89,848 |
| Couple | 29.83 | 84,879 |
| Baboon | 32.76 | 14,916 |
| Airplane | 36.30 | 93,981 |
| Sailboat | 35.47 | 44,086 |
| House | 36.01 | 77,726 |

FIG. 7

| Methods | The amount of data embedded in a 512 × 512 × 8 image |
|---|---|
| Macq's | Upper bound: 2,046 bits |
| Goljan's | 3,000-24,000 bits |
| Our proposed | 15,000-94,000 bits |

FIG. 8

(a) original histogram (b) modified histogram (a) original image (b) histogram modified image

| 2 | 4 | 7 | 4 | 7 | 3 |
|---|---|---|---|---|---|
| 3 | 4 | 5 | 3 | 4 | 1 |
| 3 | 4 | 7 | 5 | 6 | 4 |
| 0 | 2 | 2 | 4 | 5 | 4 |
| 0 | 1 | 3 | 4 | 7 | 5 |
| 0 | 3 | 4 | 5 | 3 | 2 |

(c) original image data

| 2 | 4 | 6 | 4 | 6 | 3 |
|---|---|---|---|---|---|
| 3 | 4 | 5 | 3 | 4 | 2 |
| 3 | 4 | 6 | 5 | 5 | 4 |
| 1 | 2 | 2 | 4 | 5 | 4 |
| 1 | 2 | 3 | 4 | 6 | 5 |
| 1 | 3 | 4 | 5 | 3 | 2 |

(d) modified image data

Histogram data before and after modification.

| Gray value | 0 | 1 | 2 | 3 | 4 | 5 | 6 | 7 |
|---|---|---|---|---|---|---|---|---|
| No. before modification | 3 | 2 | 4 | 7 | 10 | 5 | 1 | 4 |
| No. in modification | 3 | 0 | 6 | 7 | 10 | 6 | 0 | 4 |
| No. after modification | 0 | 3 | 6 | 7 | 10 | 6 | 4 | 0 |

FIG. 11

Bookkeeping information.

For image (6×6×3), the histogram is narrowed down 1 gray scale for both sides. G=2, G/2=1. The total bits length is 37 bits.

S=the total book-keeping bit length 37 bits (00100101) + compressed number of gray scale 2 (010) +
  the first histogram from left hand side gray scale "1" (001) +record length 6 (0110) + scan sequence (101101)+
  the first histogram from right hand side gray scale "6" (110) + record length 6 (0110) + scan sequence (110111)
S=[00100101 010 001 0110 101101 110 0110 110111]

FIG. 12

METHODS AND APPARATUS FOR LOSSLESS DATA HIDING

CROSS REFERENCE TO RELATED APPLICATIONS

This application claims the benefit of U.S. Provisional Patent Application No. 60/434,088, entitled Lossless Image Data Hiding, by inventors Yun-Qing Shi and Guorong Xuan, filed Dec. 17, 2002, the entire disclosure of which is hereby incorporated by reference.

BACKGROUND

This application is directed to methods and apparatus for data hiding in an image and, more particularly, to lossless data hiding using the integer wavelet transform.

In the field of data hiding, pieces of information represented by the data are hidden in the cover media (e.g., a pixel image). In some applications, people care about whether the embedded data are perceptible with the cover media. That is, the hidden data and the cover media may be closely related. For this type of data embedding, it may be desirable to invert the marked media back to the original cover media after the hidden data have been retrieved. For example, perceptual transparency and inversion of marked media may be desirable for applications such as medical diagnosis and law enforcement. The marking techniques satisfying these requirements are referred to as lossless, distortion-free, and reversible or invertible data hiding techniques.

Although most of the current digital watermarking algorithms are not lossless, some recent marking techniques have been reported as being lossless. For example, two methods carried out in the image spatial domain purport to be lossless. The details of these methods may be found in U.S. Pat. No. 6,278,791 (the entire disclosure of which is hereby incorporated by reference) and J. Fridrich, M. Goljan and R. Du, "Invertible Authentication," Proc. SPIE, Security and Watermarking of Multimedia Contents, pp. 197-208, San Jose, Calif., (January 2001). A purportedly lossless marking technique has also been developed in the transform domain, as is discussed in detail in B. Macq and F. Deweyand, "Trusted Headers For Medical Images," DFG VIII-D II Watermarking Workshop, Erlangen, Germany, (October 1999). As these techniques are directed toward data authentication, instead of data embedding, the amount of hidden data that may be achieved is quite limited. Another lossless marking technique that may be suitable for some higher quantities of data embedding has also been developed and is discussed in detail in U.S. patent application No.: 2003/0081809 (the entire disclosure of which is hereby incorporated by reference). The amount of hidden data achievable by this technique, however, is still not large enough for many applications, such as medical applications. Indeed, the payload ranges from 3,000 bits to 24,000 bits for a 512×512×8 grayscale image.

Accordingly, there are needs in the art for new methods and apparatus for achieving lossless marking that can embed a relatively large amount of data.

SUMMARY OF THE INVENTION

In accordance with one or more aspects of the present invention, an data hiding encoding method includes: subjecting an original, pixel domain image to an Integer Wavelet Transform (IWT) to obtain a matrix of wavelet coefficients; selecting at least one bit plane between a least significant bit plane and a most significant bit plane of the matrix of wavelet coefficients; compressing the at least one selected bit plane to produce free space in the at least one selected bit plane; embedding hidden data in the free space of the at least one compressed bit plane; and subjecting the at least one embedded bit plane and the other bit planes to an Inverse IWT to produce a marked pixel domain image.

In accordance with one or more further aspects of the present invention a hidden data decoding method includes: subjecting a marked pixel domain image to an Integer Wavelet Transform (IWT) to obtain a matrix of wavelet coefficients; selecting at least one bit plane between a least significant bit plane and a most significant bit plane of the matrix of wavelet coefficients that contains hidden data; extracting the hidden data from the at least one bit plane; decompressing the at least one bit plane; and subjecting all bit planes to an Inverse IWT to produce an original pixel domain image.

In accordance with one or more further aspects of the present invention, the methods and apparatus for controlling cache memories described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the methods of the present invention may be embodied in a software program that may be stored on any of the known or hereinafter developed media.

Other aspects, features and advantages of the present invention will become apparent to those skilled in the art when the description herein is taken in conjunction with the accompanying drawing.

BRIEF DESCRIPTION OF THE DRAWING

For the purposes of illustration, there are forms shown in the drawings that are presently preferred, it being understood, however, that the invention is not limited to the precise arrangements and instrumentalities shown.

FIG. 4 is an illustration of a pixel domain image representing data that were hidden in a number of test images in accordance with one or more aspects of the present invention;

FIG. 7 is an illustration of test results indicating peak signal to noise ratios (PSNR) and corresponding hidden data payload sizes for several test images in which hidden data have been embedded in accordance with one or more aspects of the present invention;

FIG. 8 is an illustration of comparisons between hidden data payload sizes for several embedding techniques, including that in accordance with one or more aspects of the present invention;

FIG. 11 is an illustration of the specific histogram data before, during, and after modification in accordance with one or more aspects of the present invention; and FIG. 12 is an illustration of how information concerning the modification to the histogram may be recorded for later use in a post-processing step in accordance with one or more aspects of the present invention.

DETAILED DESCRIPTION OF THE INVENTION

In general, the present invention is directed to methods and apparatus for hiding (embedding) a relatively large amount of data in an image, where the original image may be recovered without any (or any substantial) distortion from the marked image after the hidden data have been extracted. The methods and apparatus hide the data and overhead data, representing bookkeeping information, into high frequency sub-bands of one or more middle bit-planes of integer wavelet coefficients of the original pixel domain (spatial domain) image.

Figure 1:
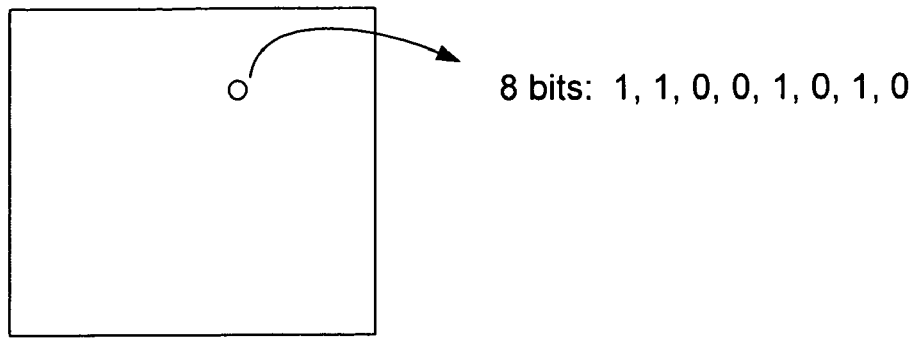
FIG. 1 is a block diagram illustrating the concept of bit planes as used in pixel (spatial) domain images and/or frequency domain images in accordance with one or more aspects of the present invention.
Figure 1:
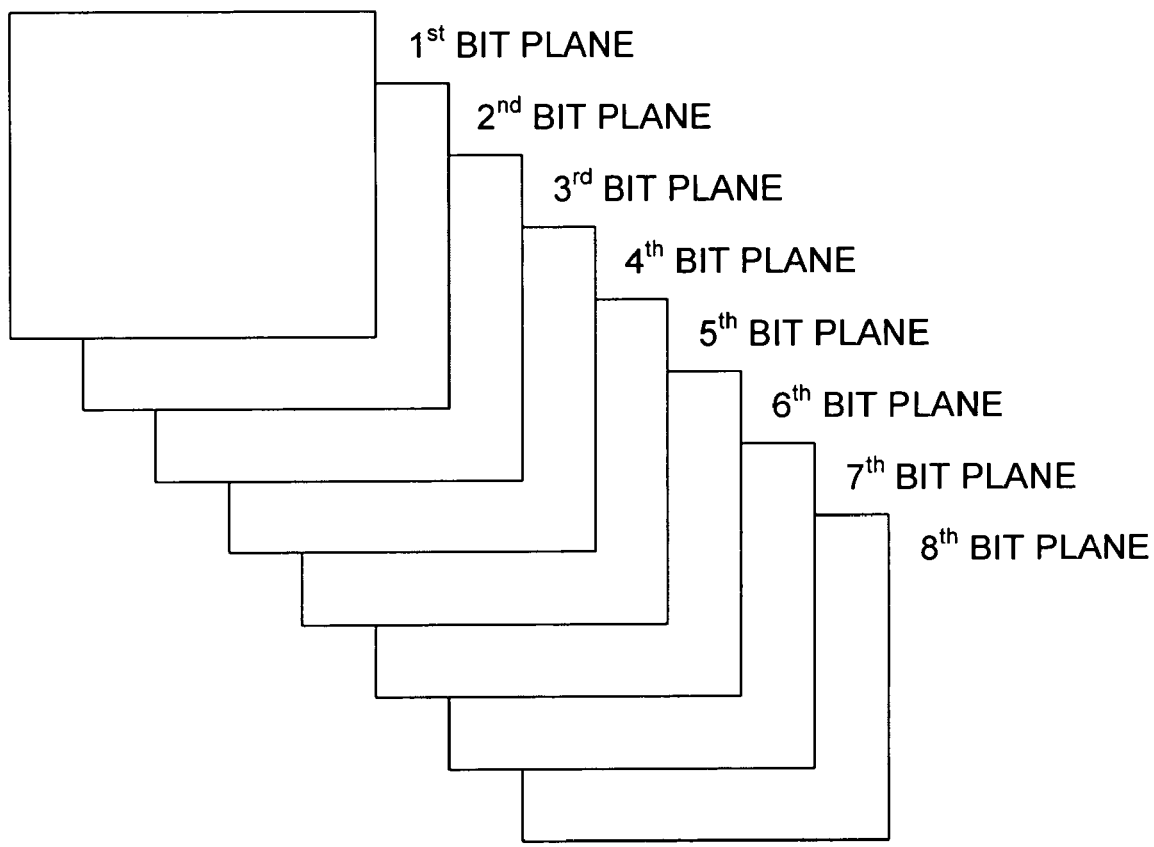

Prior to discussing further details concerning the various aspects of the present invention, reference will now be made to FIG. 1, which is a block diagram illustrating the concept of bit planes as used in pixel domain images and/or frequency domain images. As shown in the illustrated example, an image may be represented by N×M pixels. For simplicity of discussion, each pixel may be represented by 8 bits to quantify the grayscale of the image. It is noted that any number of bits may be used to represent each pixel. In this example, therefore, the original pixel image may be arranged into eight separate bit planes: a least significant bit-plane (the $1^{st}$ bit-plane), a next least significant bit-plane (the $2^{nd}$ bit-plane), etc., and a most significant bit-plane (the $8^{th}$ bit-plane). The $1^{st}$ bit-plane contains the least significant bit of each 8 bit word representing each pixel. The $2^{nd}$ bit-plane contains the next least significant bit of each 8 bit word representing each pixel, and so on.

It has been found through experimentation and study of commonly used grayscale images that binary 0s and 1s are almost randomly, equally likely, distributed in the first several "lower" bit-planes. The bias between 0s and 1 starts to gradually increase in the several "higher" bit-planes, although this bias is not very large. This kind of bias indicates the existence of redundancy in the bits, and in accordance with various aspects of the invention, implies that one may compress bits in a bit-plane or more than one bit-plane so as to leave free space to hide data. To achieve a larger bias as between 0s and 1s, which may be exploited to achieve larger free space, image transforms may be employed. For example, an Integer Wavelet Transform (IWT) may be used to transform an image form the pixel domain to the frequency domain. For example, the CDF(2, 2) and similar series used in the JPEG2000 standard may be employed. The forward transform and the inverse transform of the CDF(2, 2) Integer Wavelet Transform are as follows:

a. Forward Transform

2. Splitting: $s_i \leftarrow x_{2i} \square d_i \leftarrow x_{2i+1}$
3. Dual lifting: $d_i \leftarrow d_i - \{(s_i + s_{i+1})/2\}$
4. Primary lifting: $s_i \leftarrow s_i + \{(d_{i-1} + d_i)/4\}$ a. Inverse Transform 5. Inverse primal lifting: $s_i \leftarrow s_i - \{(d_{i-1} + d_i)/4\}$
6. Inverse dual lifting: $d_i \leftarrow d_i + \{(s_i + s_{i+1})/2\}$
7. Merging: $x_{2i} \leftarrow s_i \square x_{2i+1} \leftarrow d_i$ Further details of the IWT maybe found, for example, in A. R. Calderbank, I. Daubechies, W. Sweldens and B. Yeo, "Wavelet Transforms That Map Integers To Integers," Applied and Computational Harmonic Analysis, Vol. 5, No. 3, pp. 332-369 (1998). The IWT is a desirable transform because it can reveal more redundancy to embed more data while avoiding round-off error.

Experimental study of commonly used images has revealed that a larger bias may be achieved between binary 0s and 1s starting from the $2^{nd}$ bit-plane of the IWT coefficients of a pixel domain image, as compared to the bias of the pixel domain image itself. Further, the higher the bit-plane, the larger the apparent bias. Bit plane allocation relates to the allocation of the data to be embedded into sub-bands and corresponding bit-planes of the wavelet transform. The LSB (least significant bit) replacement method in the wavelet domain appears to perform better than that in the spatial domain because the wavelet is closer to human visual system (HVS). The HVS model points out different insensitivities among different level sub-bands. The lower level a sub-band belongs to, the more insensitive to the HVS it is. In the same level, the HH sub-band is the least sensitive, the HL and the LH sub-bands are the next, and the LL sub-band is the most. More insensitive to HVS means that more data can be embedded without causing notable visual artifacts. Thus, a change made in a high bit-plane will lead to a larger distortion. Thus, in order to have the marked image perceptually the same as the original image, it is preferred that the hidden data is embedded in a "middle" bit-plane in the IWT domain.

It is also desirable to achieve high PSNR (peak signal to noise ratio) in the marked image. To achieve this feature, it is preferred that the data are embedded in the high frequency sub-bands in accordance with various aspects of the present invention. It is most preferred that the embedded data are hidden in the $LH_1$, $HL_1$ and $HH_1$ sub-bands of one or multiple middle bit-planes.

Figure 2:
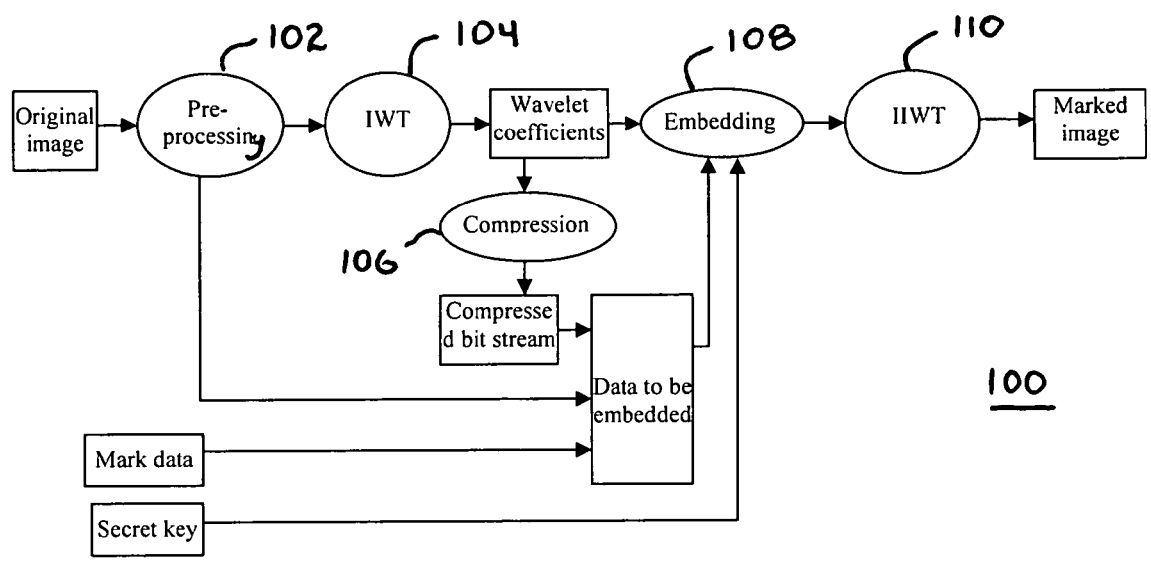
FIG. 2 is a block diagram of an encoding system for embedding hidden data in a pixel domain image in accordance with one or more aspects of the present invention.

Reference is now made to FIG. 2, which is a block diagram of an encoding system 100 for embedding hidden data in a pixel domain image in accordance with one or more aspects of the present invention. The system 100 includes a pre-processing unit 102, an IWT unit 104, a compression unit 106, an embedding unit 108, and an IIWT unit 110.

The pre-processing unit 102 is preferably operable to modify a histogram of the original image. Indeed, when certain aspects of the present invention are employed to embed hidden data in an image, it is possible for the marked image to have one or more pixels represented by overflow/underflow values, such as values representing the grayscale of the image. In particular, an overflow/underflow grayscale value may exceed an upper bound and/or a lower bound defined by the number of bits representing each pixel. For example, when the pixels of an image are represented by 8-bit words, an overflow gray scale value may exceed 255 (the upper bound of an 8-bit word). Similarly, an underflow grayscale value may fall below a lower bound of zero. It is believed that the possibility for overflow/underflow is caused by changes taking place in the selected bit plane, such as exists when the high frequency IWT coefficients are modified to include the embedded data.

In this regard, the pre-processing unit 102 is preferably operable to remove values at the extremes of the histogram, such as at zero (or near zero) and at 255 (or near 255). Indeed, it is understood that a histogram may be represented by points plotted in a Cartesian coordinate system in which discrete intensity levels exist along an ordinate axis and numbers of pixels having such intensity levels exist along an abscissa axis. The pre-processing unit 102 preferably operates to modify any data plotted near extremes of the ordinate axis toward more moderate locations. This advantageously mitigates against any overflow/underflow that may occur when modifications are made to the selected bit plane, particularly at the high frequency IWT coefficients.

The pre-processed original image (i.e., the image having a modified histogram) is passed on to the IWT unit 104. It is noted that information concerning exactly how the histogram was modified by the pre-processing unit 102 is also forwarded to the embedding unit 108 such that the marked image will contain the information. In this way, a post-process may reverse the histogram modification in order to recover the hidden data and recover the original image. The IWT unit 104 is preferably operable to subject the original image (as modified by the pre-processing unit 102) to the well-known Integer Wavelet Transformed in order to produce a matrix of wavelet coefficients.

One or more of the bit-planes of the wavelet coefficients are passed to the compression unit 106 and the remaining bit-planes of the matrix of wavelet coefficients are passed to the embedding unit 108. Indeed, at least one bit plane between a least significant bit plane and a most significant bit plane of the wavelet coefficients is selected to receive the hidden data. As discussed above, in order to have the marked image perceptually the same as the original image, it is preferred that the bit-plane selected to receive the hidden data is a "middle" bit-plane in the IWT domain. The compression unit 106 is preferably operable to subject the wavelet coefficients to an entropy coding algorithm. Although any of the known entropy coating algorithms may be employed, such as the arithmetic lossless coating algorithm, it is most preferred that the well-known JBIG lossless coding technique is employed because of its superior compression ratio. Further details concerning the arithmetic coding algorithm may be found in Y. Q. Shi and H. Sun, "Image and Video Compression for Multimedia Engineering," Boca Raton, Fla.: CRC, (1999).

A compressed bit stream may be produced by the compression unit 106, for example, utilizing a zig-zag scanning pattern.

The compressed bit stream, the information concerning the histogram preprocessing, the mark data, and an optional secret key are preferably provided to the embedding unit 108. The embedding unit 108 is preferably operable insert the hidden data and the information concerning pre-processing into the free space of the one or more selected bit planes. As discussed above, it is preferred that the hidden data are embedded in the high frequency sub-bands of the one or more selected bit planes. It is most preferred that the high frequency sub-bands are at least one of the $LH_1$, the $HL_1$, and the $HH_1$ sub-bands. The secret key may be utilized to define the organization and/or coding of how the hidden data and/or pre-processing data are embedded into the one or more selected bit planes. Thus, the hidden data may remain secret even if the algorithm for decoding a marked image is known.

Thereafter, the marked image in the frequency domain is transformed into the spatial domain utilizing the Inverse Integer Wavelet Transform carried out by the IIWT unit 110.

Figure 3:
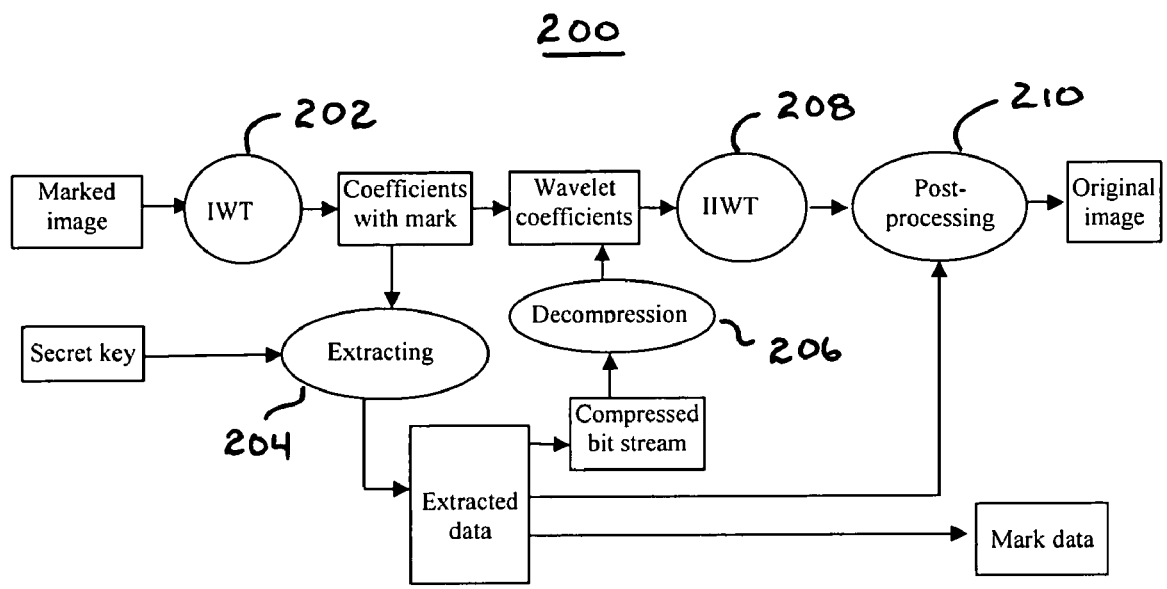
FIG. 3 is a block diagram of a decoding system for extracting embedded hidden data from the pixel domain image in accordance with one or more aspects of the present invention.

Reference is now made to FIG. 3, which is a block diagram of a decoding system 200 for extracting embedded hidden data and an original spatial image in accordance with one or more aspects of the present invention. The decoding system 200 includes an IWT unit 202, an extracting unit 204, a decompression unit 206, an IIWT unit 208, and a post-processing unit 210.

The IWT unit 202 is preferably operable to subject the marked image to the Integer Wavelet Transform in order to convert the marked image from the spatial domain into the frequency domain and to produce a matrix of IWT coefficients. The extracting unit 204 is operable to remove the hidden data and the information concerning pre-processing (i.e., the modifications made to the histogram) from the matrix of IWT coefficients. It is noted that if a secret key was utilized to embed the data in the encoding system 100 (FIG. 2) then the secret key may be necessary in order to extract such data at the decoder 200.

The selected bit-plane or planes that were compressed in the encoding system 100 are preferably subject to decompression 206 utilizing an appropriate inverse entropy coding algorithm. The output of the decompression unit 206, together with the matrix of coefficients from the IWT unit 202 produces a matrix of IWT coefficients that are input into the IIWT 208. The IIWT unit 208 converts the IWT coefficients from the frequency domain into the spatial domain, i.e., into a matrix of pixel values. The information concerning histogram modification carried out by the pre-processing unit 102 of the encoding system 100 is preferably utilized by the post-processing unit 210, which is basically an inverse algorithm to recover the original histogram information of the original image.

It is noted that the discussion herein concerning the hiding of data in bit planes representing the grayscale of an image may be readily applied by one skilled in the art to hiding data in bit planes representing the color information of an image. Indeed, the bit planes representing red, blue, and/or green (or any other color representation scheme) may be embedded with hidden data in accordance with the various aspects of the present invention.

Figure 4:
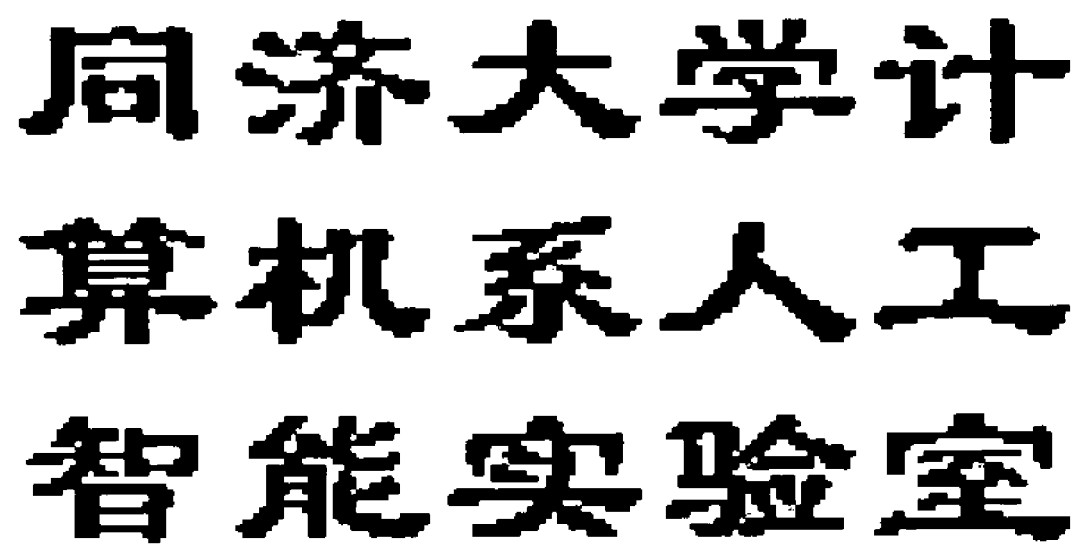
Figure 5:
FIG. 5 is an illustration of a pixel domain image in which no hidden data have been embedded.

The encoding and decoding techniques in accordance with various aspects of the present invention have been experimentally applied to a number of different images with successful results. For example, various encoding algorithms of the invention have been applied to grayscale images and medical images. FIG. 4, illustrates hidden data that were embedded into a number of images. The hidden data constitute a binary logo image, equivalent to a binary sequence of 23,040 bits. For comparison purposes, the well-known image of "Lena" illustrated in FIG. 5 has not been embedded with any hidden data.

This original Lena pixel image is 512×512×8 bits. Using the various features of the present invention, the data of FIG. 4 as well as book-keeping data (pre-processing histogram modification data), and the losslessly compressed data of one or more of the bit-planes of the Lena image were combined to produce the marked Lena image of FIG. 6. In particular, the original $5^{th}$ bit-plane of the IWT coefficients of the original Lena image was selected to receive the mark data and the pre-processing information. The $5^{th}$ bit-plane of the IWT coefficients was subjected to arithmetic entropy coding to produce free space in that bit plane and all the data were embedded into the high frequency sub-bands of this bit plane. More particularly, the hidden data were embedded into the high frequency sub-bands $LH_1$, $HL_1$ and $HH_1$ of the $5^{th}$ bit-plane.

Pre-processing was also carried out on the original Lena image using the following histogram modification algorithm: the lowest and the highest 16 grayscale values were mapped to grayscale values 15 and 240, respectively. In this way, the overflow/underflow is avoided. In order to recover the original image losslessly, the data representing the necessary book-keeping information were also hidden as overhead.

A secret key was also used to define the form of the embedded data. The secret key function used was y=(k0+k1×x) mod s, in which k0=1030, k1=289, s=3×256×256, and x, y are the coordinates in the $5^{th}$ bit-plane.

Figure 6:
FIG. 6 is an illustration of the pixel domain image of FIG. 5 in which hidden data have been embedded in accordance with one or more aspects of the present invention.

It is noted that there are no perceptible artifacts in the marked Lena image of FIG. 6, although as illustrated in FIG. 7, the PSNR of the marked image is not as particularly high. FIG. 7 also shows the PSNR and lay load values demonstrated on a number of other images. Even though the PSNR of the marked pepper image is only 29.11 dB, there were no any annoying structural interferences that could be observed. The experimental results demonstrated that the low PSNR was attributable to the histogram modification in the pre-processing stage.

FIG. 8 illustrates a comparison between existing lossless marking techniques and the techniques enjoyed by the present invention in terms of pay-load.

Figure 9:
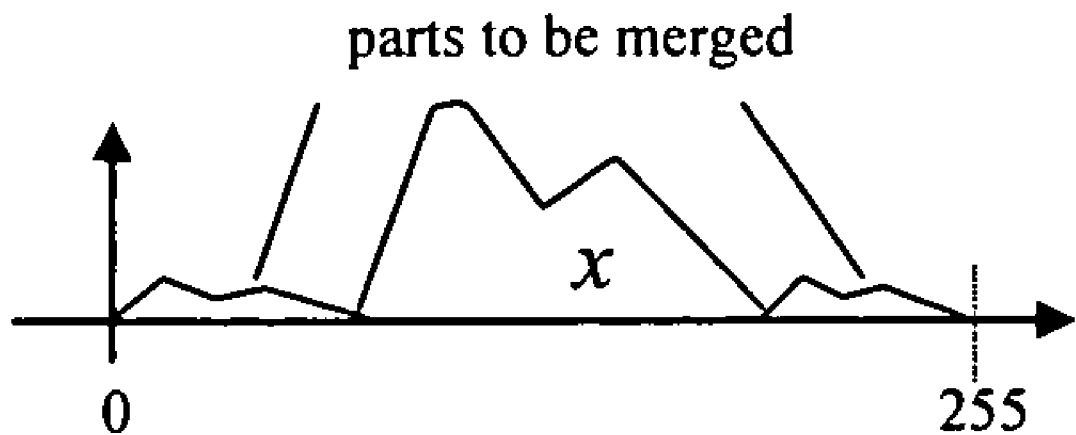
FIG. 9 is an illustration of comparisons between an unmodified histogram and a modified histogram of an image in accordance with one or more aspects of the present invention.
Figure 9:
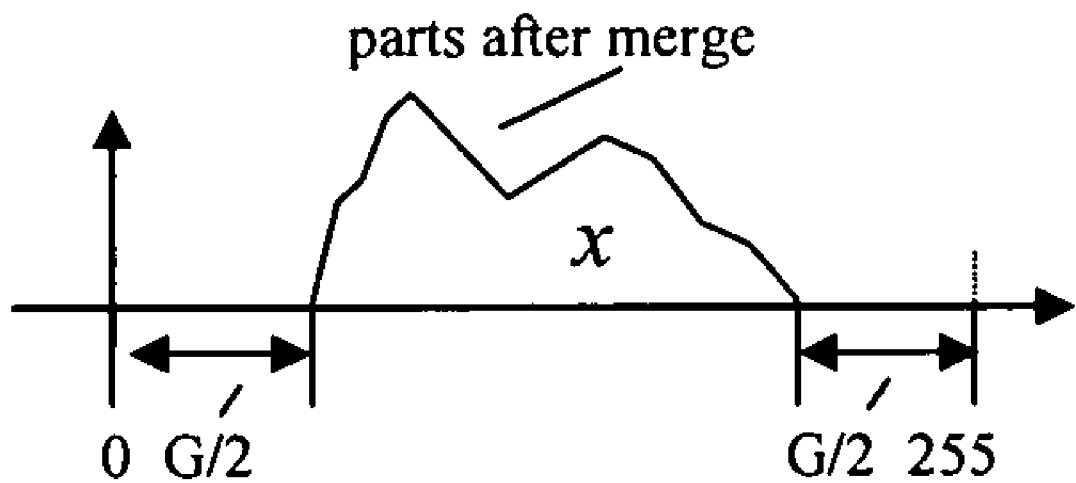

Although the specific histogram modification technique described above may be used, any of the known histogram modification or grayscale mapping techniques may be used to prevent overflow/underflow in accordance with various aspects of the present invention. Further details regarding a preferred histogram modification technique will now be provided. In order to prevent overflow/underflow after the inverse wavelet transform, the pre-processing histogram modification preferably narrows the histogram from both sides as shown in FIG. 9. In narrowing down a histogram to the range G/2, 255-G/2, the histogram modification information should be recorded as part of the embedded data. Thus, the embedded data include three parts: the watermark signal, bookkeeping information of the histogram modification, and losslessly compressed data from the original bit-planes.

Figure 10:
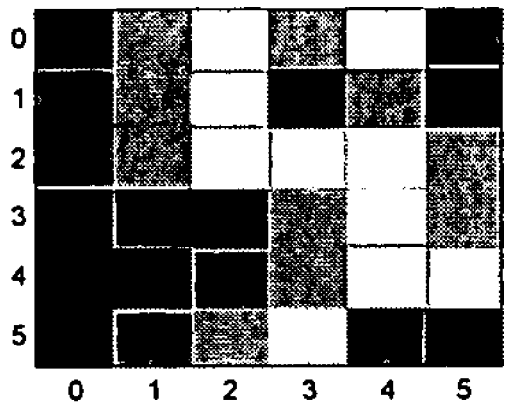
FIG. 10 is an illustration of a specific example of modifying a histogram to achieve results similar to that of FIG. 9 in accordance with one or more aspects of the present invention.
Figure 10:
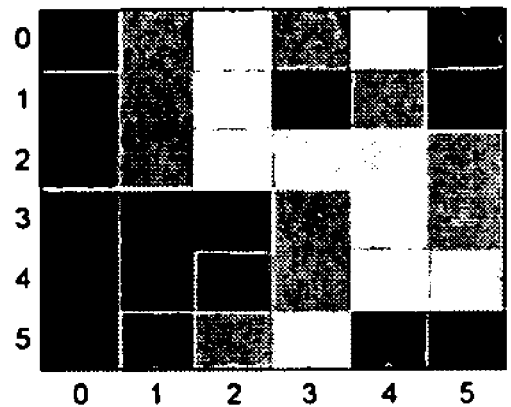

In order to illustrate the histogram modification, an illustrative, simplified example will now be described in which the size of an original image is 6×6 with $8=2^3$ grayscales (6×6×3) as shown in FIG. 10. From FIG. 10 and FIG. 11, it can be seen that the range of the modified histogram is from 1-6 instead of 0-7. In other words, no pixel assumes a grayscale of 0 and/or 7. After modification, the grayscale of 1 is merged into the grayscale of 2. The grayscale of 0 becomes the grayscale of 1. In the same way, the grayscale of 6 is merged into the grayscale of 5. And the grayscale of 7 becomes the grayscale of 6.The details of the differences in the histogram of the image before and after modification are shown in FIGS. 10 and 11.

With reference to FIG. 12 the bookkeeping information concerning what changes were made to the histogram illustrated. The scan sequence from the left hand side (101101) in FIG. 12 shows that both second and fifth "2" in FIG. 10 are "1" in FIG. 10 originally by scanning as follows: (<x=5, y=1>,<(x=1, y=4>). The scan sequence from the right hand side (11011) in FIG. 12 shows that the third "5" by scanning (<x=4,y=2>) in FIG. 10 is "6" in FIG. 10 originally.

Using the alternative pre-processing histogram modification technique described above and by using more than one bit plane in which to hide data, a significant improvement in PSNR and payload may be achieved as compared to the results of FIG. 7 above. Indeed, as to the Lena image: with a PSNR of 35 dB, a payload of 0.5 bpp (bits per pixel), i.e., 131,072 bits, can be hidden inside a 512×512 grayscale image. With a PSNR of 44 dB, a payload of 0.15 bpp, i.e., 39,321 bits, can be hidden inside the 512×512 grayscale image.

Advantageously, various aspects of the present invention permit the hiding (embedding) of a relatively large amount of data in an image, where the original image may be recovered without substantial (or any) distortion from the marked image after the hidden data have been extracted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   preprocessing an original pixel domain image to modify any data plotted at extremes of an ordinate axis of the original pixel domain image;
   subjecting the preprocessed pixel domain image to an Integer Wavelet Transform (IWT) to obtain a matrix of wavelet coefficients;
   selecting at least one bit plane between a least significant bit plane and a most significant bit plane of the matrix of wavelet coefficients;
   compressing the at least one selected bit plane to produce free space in the at least one selected bit plane;
   embedding hidden data in the free space of the at least one compressed bit plane; and
   subjecting the at least one embedded bit plane and the other bit planes to an Inverse IWT to produce a marked pixel domain image.

2. The method of claim 1, wherein the at least one selected bit plane is taken from a range of about a 2nd bit plane and a 6th bit plane of the matrix of wavelet coefficients.

3. The method of claim 1, wherein the at least one selected bit plane is taken from a range of about a 3rd bit plane and a 6th bit plane of the matrix of wavelet coefficients.

4. The method of claim 1, wherein the at least one selected bit plane is taken from a range of about a 4th bit plane and a 6th bit plane of the matrix of wavelet coefficients.

5. The method of claim 1, wherein the step of compressing the at least one selected bit plane includes using an entropy coding algorithm to produce the free space.

6. The method of claim 5, wherein the entropy coding algorithm arithmetic lossless coding.

7. The method of claim 5, wherein the entropy coding algorithm is JBIG lossless coding.

8. The method of claim 1, further comprising using a key to establish one or more parameters defining how the hidden data is embedded in the free space, wherein knowledge of the key is necessary to extract the hidden data from the free space.

9. The method of claim 1, further comprising embedding the hidden data in high frequency sub-bands of the selected bit plane.

10. The method of claim 9, wherein the high frequency sub-bands are at least one of a $LH_1$, a $HL_1$ and a $HH_1$ sub-band.

11. The method of claim 1, further comprising modifying a histogram of the original image such that one or more locations at extremes of the histogram are empty prior to embedding the selected bit plane with the hidden data.

12. The method of claim 11, wherein: the histogram may be represented by points plotted in a Cartesian coordinate system in which discrete intensity levels exist along an ordinate axis and numbers of pixels having such intensity levels exist along an abscissa; and the modification includes moving any data plotted near extremes of the ordinate axis toward more moderate locations.

13. The method of claim 12, further comprising embedding information indicative of the movement of the data away from the extremes of the ordinate axis in the free space prior to subjecting the at least one embedded bit plane to the Inverse IWT.

14. An apparatus including a processor operating under the instructions of a software program, the software program causing the apparatus to perform actions, comprising:
   preprocessing an original pixel domain image to modify any data plotted at extremes of an ordinate axis of the original pixel domain image;
   subjecting the preprocessed pixel domain image to an Integer Wavelet Transform (IWT) to obtain a matrix of wavelet coefficients;
   selecting at least one bit plane between a least significant bit plane and a most significant bit plane of the matrix of wavelet coefficients;
   compressing the at least one selected bit plane to produce free space in the at least one selected bit plane;
   embedding hidden data in the free space of the at least one compressed bit plane; and
   subjecting the at least one embedded bit plane and the other bit planes to an Inverse IWT to produce a marked pixel domain image.

15. The apparatus of claim 14, wherein the at least one selected bit plane is taken from a range of about a 2nd bit plane and a 6th bit plane of the matrix of wavelet coefficients.

16. The apparatus of claim 14, wherein the at least one selected bit plane is taken from a range of about a 3rd bit plane and a 6th bit plane of the matrix of wavelet coefficients.

17. The apparatus of claim 14, wherein the at least one selected bit plane is taken from a range of about a 4th bit plane and a 6th bit plane of the matrix of wavelet coefficients.

18. The apparatus of claim 14, wherein the step of compressing the at least one selected bit plane includes using an entropy coding algorithm to produce the free space.

19. The apparatus of claim 18, wherein the entropy coding algorithm arithmetic lossless coding.

20. The apparatus of claim 18, wherein the entropy coding algorithm is JBIG lossless coding.

21. The apparatus of claim 14, further comprising using a key to establish one or more parameters defining how the hidden data is embedded in the free space, wherein knowledge of the key is necessary to extract the hidden data from the free space.

22. The apparatus of claim 14, further comprising embedding the hidden data in high frequency sub-bands of the selected bit plane.

23. The apparatus of claim 22, wherein the high frequency sub-bands are at least one of a $LH_1$, a $HL_1$ and a $HH_1$ sub-band.

24. The apparatus of claim 14, further comprising modifying a histogram of the original image such that one or more locations at extremes of the histogram are empty prior to embedding the selected bit plane with the hidden data.

25. The apparatus of claim 24, wherein: the histogram may be represented by points plotted in a Cartesian coordinate system in which discrete intensity levels exist along an ordinate axis and numbers of pixels having such intensity levels exist along an abscissa; and the modification includes moving any data plotted near extremes of the ordinate axis toward more moderate locations.

26. The apparatus of claim 25, further comprising embedding information indicative of the movement of the data away from the extremes of the ordinate axis in the free space prior to subjecting the at least one embedded bit plane to the Inverse IWT.

27. A computer-readable storage medium containing a software program operable to cause an apparatus including a processor operating under the instructions of the software program to perform actions, comprising:
   preprocessing an original pixel domain image to modify any data plotted at extremes of an ordinate axis of the original pixel domain image;
   subjecting the processed pixel domain image to an Integer Wavelet Transform (IWT) to obtain a matrix of wavelet coefficients;
   selecting at least one bit plane between a least significant bit plane and a most significant bit plane of the matrix of wavelet coefficients;
   compressing the at least one selected bit plane to produce free space in the at least one selected bit plane;
   embedding hidden data in the free space of the at least one compressed bit plane; and
   subjecting the at least one embedded bit plane and the other bit planes to an Inverse IWT to produce a marked pixel domain image.

28. An apparatus, comprising:
   means for preprocessing an original pixel domain image to modify any data plotted at extremes of an ordinate axis of the original pixel domain image;
   means for subjecting the preprocessed pixel domain image to an Integer Wavelet Transform (IWT) to obtain a matrix of wavelet coefficients;
   means for selecting at least one bit plane between a least significant bit plane and a most significant bit plane of the matrix of wavelet coefficients;
   means for compressing the at least one selected bit plane to produce free space in the at least one selected bit plane;
   means for embedding hidden data in the free space of the at least one compressed bit plane; and
   means for subjecting the at least one embedded bit plane and the other bit planes to an Inverse IWT to produce a marked pixel domain image.

29. A method, comprising:
   subjecting a marked pixel domain image to an Integer Wavelet Transform (IWT) to obtain a matrix of wavelet coefficients;
   selecting at least one bit plane between a least significant bit plane and a most significant bit plane of the matrix of wavelet coefficients that contains hidden data;

extracting the hidden data from the at least one bit plane;
  decompressing the at least one bit plane;
subjecting all bit planes to an Inverse IWT; and
postprocessing the output of the Inverse IWT to recover original histogram information and produce an original pixel domain image.

30. The method of claim 29, wherein the at least one bit plane is taken from a range of about a 2nd bit plane and a 6th bit plane of the matrix of wavelet coefficients.

31. The method of claim 29, wherein the at least one bit plane is taken from a range of about a 3rd bit plane and a 6th bit plane of the matrix of wavelet coefficients.

32. The method of claim 29, wherein the at least one bit plane is taken from a range of about a 4th bit plane and a 6th bit plane of the matrix of wavelet coefficients.

33. The method of claim 29, wherein the step of decompressing the at least one bit plane includes using an inverse entropy coding algorithm.

34. The method of claim 33, wherein the inverse entropy coding algorithm is one of an arithmetic lossless coding technique, and a JBIG lossless coding technique.

35. The method of claim 29, further comprising using a key to establish one or more parameters defining how the hidden data was embedded in the at least one bit plane to extract the hidden data.

36. The method of claim 29, wherein the hidden data were embedded in high frequency sub-bands of the selected bit plane.

37. The method of claim 36, wherein the high frequency sub-bands are at least one of a $LH_1$, a $HL_1$ and a $HH_1$ sub-band.

38. The method of claim 29, wherein: a histogram of the original image was modified such that one or more locations at extremes of the histogram were empty prior to embedding the at least one bit plane with the hidden data.

39. The method of claim 38, wherein information regarding how the histogram of the original image was modified is included in the hidden data.

40. The method of claim 39, further comprising reversing the modification to the histogram using the information regarding how the histogram of the original image was modified.

41. An apparatus including a processor operating under the instructions of a software program, the software program causing the apparatus to perform actions, comprising:
  subjecting a marked pixel domain image to an Integer Wavelet Transform (IWT) to obtain a matrix of wavelet coefficients;
  selecting at least one bit plane between a least significant bit plane and a most significant bit plane of the matrix of wavelet coefficients that contains hidden data;
  extracting the hidden data from the at least one bit plane;
  decompressing the at least one bit plane;
  subjecting all bit planes to an Inverse IWT; and
  postprocessing the output of the Inverse IWT to recover original histogram information and produce an original pixel domain image.

42. The apparatus of claim 41, wherein the at least one bit plane is taken from a range of about a 2nd bit plane and a 6th bit plane of the matrix of wavelet coefficients.

43. The apparatus of claim 41, wherein the at least one bit plane is taken from a range of about a 3rd bit plane and a 6th bit plane of the matrix of wavelet coefficients.

44. The apparatus of claim 41, wherein the at least one bit plane is taken from a range of about a 4th bit plane and a 6th bit plane of the matrix of wavelet coefficients.

45. The apparatus of claim 41, wherein the step of decompressing the at least one bit plane includes using an inverse entropy coding algorithm.

46. The apparatus of claim 45, wherein the inverse entropy coding algorithm is one of an arithmetic lossless coding technique, and a JBIG lossless coding technique.

47. The apparatus of claim 41, further comprising using a key to establish one or more parameters defining how the hidden data was embedded in the at least one bit plane to extract the hidden data.

48. The apparatus of claim 41, wherein the hidden data were embedded in high frequency sub-bands of the selected bit plane.

49. The apparatus of claim 48, wherein the high frequency sub-bands are at least one of a $LH_1$, a $HL_1$ and a $HH_1$ sub-band.

50. The apparatus of claim 41, wherein: a histogram of the original image was modified such that one or more locations at extremes of the histogram were empty prior to embedding the at least one bit plane with the hidden data.

51. The apparatus of claim 50, wherein information regarding how the histogram of the original image was modified is included in the hidden data.

52. The apparatus of claim 51, further comprising reversing the modification to the histogram using the information regarding how the histogram of the original image was modified.

53. A computer-readable storage medium containing a software program operable to cause an apparatus including a processor operating under the instructions of the software program to perform actions, comprising:
  subjecting a marked pixel domain image to an Integer Wavelet Transform (IWT) to obtain a matrix of wavelet coefficients;
  selecting at least one bit plane between a least significant bit plane and a most significant bit plane of the matrix of wavelet coefficients that contains hidden data;
  extracting the hidden data from the at least one bit plane;
  decompressing the at least one bit plane;
  subjecting all bit planes to an Inverse IWT; and
  postprocessing the output of the Inverse IWT to recover original histogram information and produce an original pixel domain image to produce.

54. An apparatus, comprising:
  means for subjecting a marked pixel domain image to an Integer Wavelet Transform (IWT) to obtain a matrix of wavelet coefficients;
  means for selecting at least one bit plane between a least significant bit plane and a most significant bit plane of the matrix of wavelet coefficients that contains hidden data;
  means for extracting the hidden data from the at least one bit plane;
  means for decompressing the at least one bit plane;
  means for subjecting all bit planes to an Inverse IWT; and
  postprocessing the output of the Inverse IWT to recover original histogram information and produce an original pixel domain image.

* * * * *